United States Patent
Kondo et al.

(10) Patent No.: US 7,726,818 B2
(45) Date of Patent: Jun. 1, 2010

(54) IMAGE FORMING APPARATUS AND METHOD

(75) Inventors: Tetsujiro Kondo, Tokyo (JP); Tetsushi Kokubo, Kanagawa (JP); Kenji Tanaka, Tokyo (JP); Hitoshi Mukai, Kanagawa (JP); Kazumasa Tanaka, Chiba (JP); Hirofumi Hibi, Tokyo (JP)

(73) Assignee: Sony Corporation, Tokyo (JP)

( * ) Notice: Subject to any disclaimer, the term of this patent is extended or adjusted under 35 U.S.C. 154(b) by 746 days.

(21) Appl. No.: 11/627,567

(22) Filed: Jan. 26, 2007

(65) Prior Publication Data

US 2007/0177111 A1   Aug. 2, 2007

(30) Foreign Application Priority Data

Jan. 27, 2006 (JP) ............................ 2006-018976
Nov. 27, 2006 (JP) ............................ 2006-318321

(51) Int. Cl.
*G03B 21/26* (2006.01)
(52) U.S. Cl. ....................................................... 353/94
(58) Field of Classification Search ................. 353/30, 353/94, 102; 348/756; 345/32, 40; 359/448, 359/456, 443–461
See application file for complete search history.

(56) References Cited

U.S. PATENT DOCUMENTS

| 5,902,030 | A | * | 5/1999 | Blanchard | 353/30 |
| 6,513,938 | B2 | * | 2/2003 | Kubota et al. | 353/94 |
| 6,710,920 | B1 | * | 3/2004 | Mashitani et al. | 359/463 |
| 6,733,138 | B2 | | 5/2004 | Raskar | |
| 6,760,075 | B2 | * | 7/2004 | Mayer et al. | 348/383 |
| 6,781,563 | B2 | * | 8/2004 | Nishio et al. | 345/1.1 |

FOREIGN PATENT DOCUMENTS

| JP | 6-284363 | 10/1994 |
| JP | 2005-500756 | 1/2005 |

* cited by examiner

*Primary Examiner*—Georgia Y Epps
*Assistant Examiner*—Danell L Owens
(74) *Attorney, Agent, or Firm*—Oblon, Spivak, McClelland, Maier & Neustadt, L.L.P.

(57) ABSTRACT

An image forming apparatus which forms a whole image including a first part image and a second part image on a front side of an image forming target unit formed by overlapping portions of the first and second part images is disclosed. The image forming apparatus includes: the image forming target unit; a first projector; a second projector; a first planoconvex lens; and a second planoconvex lens.

4 Claims, 8 Drawing Sheets

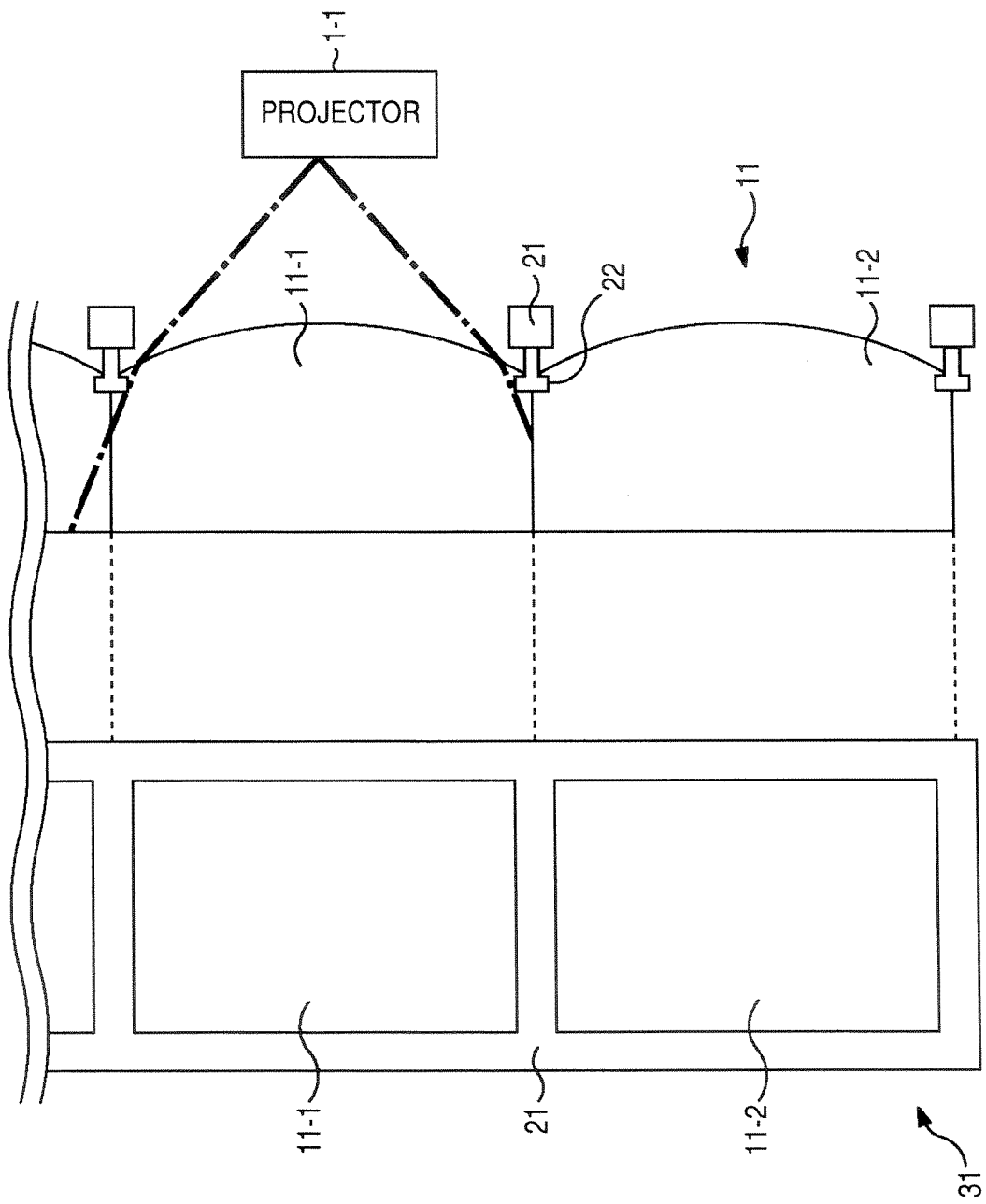

IMAGE FORMING APPARATUS AND METHOD

CROSS REFERENCES TO RELATED APPLICATIONS

The present invention contains subject matter related to Japanese Patent Application JP 2006-018976 and JP 2006-318321 filed in the Japanese Patent Office on Jan. 27, 2006 and Nov. 27, 2006, respectively, the entire contents of which are incorporated herein by reference.

BACKGROUND

1. Technical Field

The present invention relates to an image forming apparatus and method including a plurality of projectors, and more particularly, to image forming apparatus and method in which a joint portion of each image formed by each one of the projectors can be unnoticeable to a user regardless of a position of the user.

2. Background Art

In related art, a system for forming a large image on a screen or the like by joining images which are projected from a plurality of projectors, that is, a multi-projector system is used (see JP-T-2005-500756 and JP-A-6-284363).

As an example, in JP-T-2005-500756, a multi-projector system as shown in FIG. 1 is disclosed. In the example shown in FIG. 1, two projectors 1-1 and 1-2 are disposed in a rear side of screen 2 from a user (viewer) Hereinafter, a system in which a projector is disposed in a rear side of a screen from a user is referred to as a rear projector system.

In the example shown in FIG. 1, two projectors 1-1 and 1-2 form images, respectively on screen 2 so that a portion of each image is overlapped with a portion of an adjacent image. Hereinafter, an image which is formed on a screen by each one of the plurality of projectors (two projectors 1-1 and 1-2 in the example shown in FIG. 1) will be referred to as a part image. In the case, as a result, a whole large image (hereinafter, referred to as a whole image) including a plurality of part images is formed on the screen. In other words, in the example shown in FIG. 1, two part images are formed on screen 2 by two projectors 1-1 and 1-2, respectively, and as a result, a whole image including the two part images is formed on screen 2.

Hereinafter, an overlapped portion of the two part images, that is, each aforementioned portion of each one of the two part images is referred to as a blending area. In other words, a blending area means an overlapped portion.

Hereinafter, a technique by which a whole image including a blending area is formed on a screen or the like is referred to as a tiling technique.

As described above, in JP-T-2005-500756, a multi rear projector system in related art in which the tiling technique is used is disclosed.

SUMMARY OF THE INVENTION

However, in a multi rear projector system in related art in which such a tiling technique as disclosed in JP-T-2005-500756 is used, there is a problem that a joint spot of the blending area becomes noticeable (hereinafter, referred to as a viewing position deterioration problem) to a user when a viewing position of the user shifts slightly.

The reasons for the viewing position deterioration problem are as follows.

Light irradiated from a projector onto a back side of a screen is projected from a front side of the screen. Hereinafter, the light beam which is projected from the front side of the screen is called a projected light beam. Hereinafter, a direction perpendicular to an image forming surface, that is, the normal direction of an image forming surface is set to be 0 degree which is used as a reference angle.

In the case, in the example shown in FIG. 1, a spot of point A on screen 2 becomes a joint spot of a blending area, and the angles of projected light beams of projectors 1-1 and 1-2 at point A are different from each other as shown in FIG. 2.

FIG. 2 shows brightness distribution of a projected light beam at point A. In more details, curve r1 represents brightness distribution of a projected light beam of projector 1-1. In addition, curve r2 represents brightness distribution of a projected light beam of projector 1-2. As an example, when an angle of a projected light beam is defined as an angle at which brightness becomes maximal, an angle (about −10 degree) at which the brightness of curve r1 becomes maximal is the angle of the projected light beam of projector 1-1. And also, an angle (about 30 degree) at which the brightness of curve r2 becomes maximal is the angle of the projected light beam of projector 1-2. As described above, the angles of the projected light beams of projectors 1-1 and 1-2 at point A are different from each other as shown in FIG. 2.

Since the angles of the projected light beams of projectors 1-1 and 1-2 are far apart from 0 degree, an uneven light appears in scattered light of light projected at point A on screen 2 from each one of projectors 1-1 and 1-2. Accordingly, in brightness distribution (curves r1 and r2) of each one of the projected light beams of projectors 1-1 and 1-2, the brightness decreases gradually to the left or right side from an angle at which the brightness becomes maximal, but the degree of decrease in brightness is not bilaterally symmetrical and is completely different between the left and right sides.

Accordingly, the brightness distribution of total projected light beams of projectors 1-1 and 1-2, as shown as curve rt, becomes far from ideal brightness distribution. The ideal brightness distribution means brightness distribution in which brightness has a maximal value at 0 degree and decreases gradually from the 0 degree bilaterally. To the contrary, in the brightness distribution of the total projected light beams of projectors 1-1 and 1-2, as shown as curve rt, an angle at which the brightness becomes maximal is about 20 degrees, and the brightness gradually decreases to the left or right side from the angle (about 20 degrees), but the degrees of decrease in the left and right sides are completely different.

In the case, to the user, an image corresponding to a light beam having the brightness distribution as shown as rt, that is, an image corresponding to the total projected light beams of projectors 1-1 and 1-2 is viewed as an image of a spot of point A, that is, a joint spot of a blending area in the eyes. Accordingly, to the user, the image of the spot of point A is to be seen differently depending on a viewing position, and as a result, the viewing position deterioration problem described above occurs.

As described above, the reason for the occurrence of the viewing position deterioration is that the projected light beams of the projectors have different angles which are far from 0 degree, respectively.

The viewing position deterioration problem occurs in a rear projector system including one projector, too. The reason is that an angle of a light beam of light irradiated on a screen which is projected at a position off a center of the projector becomes a specific degree, other than 0 degree. As an example, the reason is that, when a rear projector system including only projector 1-1 is used, an image of light having the brightness distribution of curve r1 shown in FIG. 2 is viewed to the user in the eyes as an image of a spot of point A.

In order to solve the viewing position deterioration problem in a rear projector system including one projector, as shown in FIG. 3, a technique in which fresnel lens 3 is disposed in a rear side of screen 2 is used in related art. In other words, a light beam from projector 1 changes its direction by fresnel lens 3 to be incident onto screen 2 with an incident angle of almost 0 degree. Accordingly, as shown in FIG. 3, the angle of the projected light beam becomes almost 0 degree in any position on screen 2, and accordingly, it is possible to solve the viewing position deterioration problem.

However, the technique cannot be directly applied to a multi rear projector system in which the tiling technique is used. The reason is, as shown in FIG. 4, an interference caused by fresnel lens 3 occurs in blending area 4. In other words, FIG. 4 is a diagram when fresnel lens 3 is to be used in a multi-projector system in related art of FIG. 1. In the case, an interference caused by fresnel lens 3 occurs in blending area 4.

In JP-A-6-284363, technology in which projectors are moved concentrically is disclosed, but it is difficult to apply the technology to a large-sized system, although it is possible to apply the technology to a small-sized system such as shown in JP-A-6-284363.

Thus, it is desirable to solve a viewing position deterioration problem as possibly as can even in a multi rear projector system in related art in which the tiling technique is used.

According to an embodiment of the present invention, there is provided an image forming apparatus which forms a whole image including a first part image and a second part image on a front side of an image forming target unit formed by overlapping portions of the first and second part images, the image forming apparatus including: the image forming target unit; a first projector projecting light corresponding to the first part image onto a back side of the image forming target unit; a second projector projecting light corresponding to the second part image onto the back side of the image forming target unit; a first planoconvex lens corresponding to the first projector; and a second planoconvex lens corresponding to the second projector, wherein the first and second planoconvex lenses are configured so that flat sides of the first and second planoconvex lenses face a back side of the image forming target unit, a convex side of the first planoconvex lens faces a projection side of the first projector, a convex side of the second planoconvex lens faces a projection side of the second projector, and a position at which light beams projected from the first and second projectors meet with each other is inside the first or second planoconvex lenses, and wherein the image forming target unit, the first and second projectors, and the first and second planoconvex lenses are separately disposed, respectively.

The first and second planoconvex lenses may be formed into one structure.

The image forming target unit may be a soft screen, and on flat sides of the first and second planoconvex lenses of the structure, a back side of the soft screen may be attached.

According to another embodiment of the present invention, there is provided an image forming method using an image forming apparatus including an image forming target unit on which the image is formed in a front side by projecting light corresponding to an image on a back side of the image forming target unit, a first projector projecting light corresponding to a first image onto a back side of the image forming target unit, a second projector projecting light corresponding to a second image onto the back side of the image forming target unit, a first planoconvex lens corresponding to the first projector, and a second planoconvex lens corresponding to the second projector, wherein the first and second planoconvex lenses are configured so that flat sides of the first and second planoconvex lenses face a back side of the image forming target unit, a convex side of the first planoconvex lens faces a projection side of the first projector, a convex side of the second planoconvex lens faces a projection side of the second projector, and a position at which light beams projected from the first and second projectors meet with each other is inside the first or second planoconvex lenses, and wherein the image forming target unit, the first and second projectors, and the first and second planoconvex lenses are separately disposed, respectively, the image forming method including the steps of: forming the first image on a front side of the image forming target unit by projecting light corresponding to the first image which is irradiated from the first projector onto a back side of the image forming target unit through the first planoconvex lens; forming the second image on the front side of the image forming target unit by projecting light corresponding to the second image which is irradiated from the second projector onto the back side of the image forming target unit through the second planoconvex lens; and forming an image including the first and second images and having an overlapped area between a part of the first image and a part of the second image on the front side of the image forming target unit.

In an image forming apparatus and method according to an embodiment of the present invention, an image forming apparatus including an image forming target unit on which the image is formed on a front side by projecting light corresponding to an image on a back side of the image forming target unit, a first projector for projecting light corresponding to the first part image onto a back side of the image forming target unit, a second projector for projecting light corresponding to the second part image onto the back side of the image forming target unit, a first planoconvex lens corresponding to the first projector, and a second planoconvex lens corresponding to the second projector becomes a target. In the image forming apparatus, the first and second planoconvex lenses are configured so that flat sides of the first and second planoconvex lenses face a back side of the image forming target unit, a convex side of the first planoconvex lens faces a projection side of the first projector, a convex side of the second planoconvex lens faces a projection side of the second projector, and a position at which light beams projected from the first and second projectors meet with each other is inside the first or second planoconvex lenses, and the image forming target unit, the first and second projectors, and the first and second planoconvex lenses are separately disposed, respectively. In the status configured described above, when light corresponding to the first image which is irradiated from the first projector is projected onto a back side of the image forming target unit through the first planoconvex lens, the first image is formed on a front side of the image forming target unit, light corresponding to the second image which is irradiated from the second projector is projected onto the back side of the image forming target unit through the second planoconvex lens, and the second image is formed on the front side of the image forming target unit, as a result, an image including the first and second images and having an overlapped area between a part of the first image and a part of the second image is formed on the front side of the image forming target unit.

As described above, according to an embodiment of the present invention, an image having an overlapped portion of first and second part images, that is, a blending area can be formed. Moreover, to a user viewing the image, the blending area can be made unnoticeable regardless of the user's position.

BRIEF DESCRIPTION OF THE DRAWINGS

FIG. 8 is a diagram illustrating a fixing technique of a planoconvex lens in the multi rear projector system shown in FIG. 5.

DETAILED DESCRIPTION OF PREFERRED EMBODIMENTS

Embodiments of the invention will be described below, in which correspondence of constituent requirements of the invention to the embodiments described or shown in the specification or the drawings is as follows. This description is to confirm that the embodiments supporting the invention are described or shown in the specification or the drawings. Accordingly, even when any embodiment described in the specification or the drawings but not described as the embodiments corresponding to the constituent requirements of the invention exist, it does not means that the embodiment does not correspond to the constituent requirements. On the contrary, even when an embodiment is described as corresponding to the constituent requirements of the invention, it does not mean that the embodiment does not correspond to constituent requirements other than the constituent requirements of the invention.

This description does not mean that all invention corresponding to the embodiments described in the specification or the drawings are described in the claims. In other words, this description is for the invention corresponding to embodiments described in the specification or the drawings and does not deny the existence of invention not described in the claims, that is, the existence of invention which may be added by division of application or amendments in the future.

Figure 5:
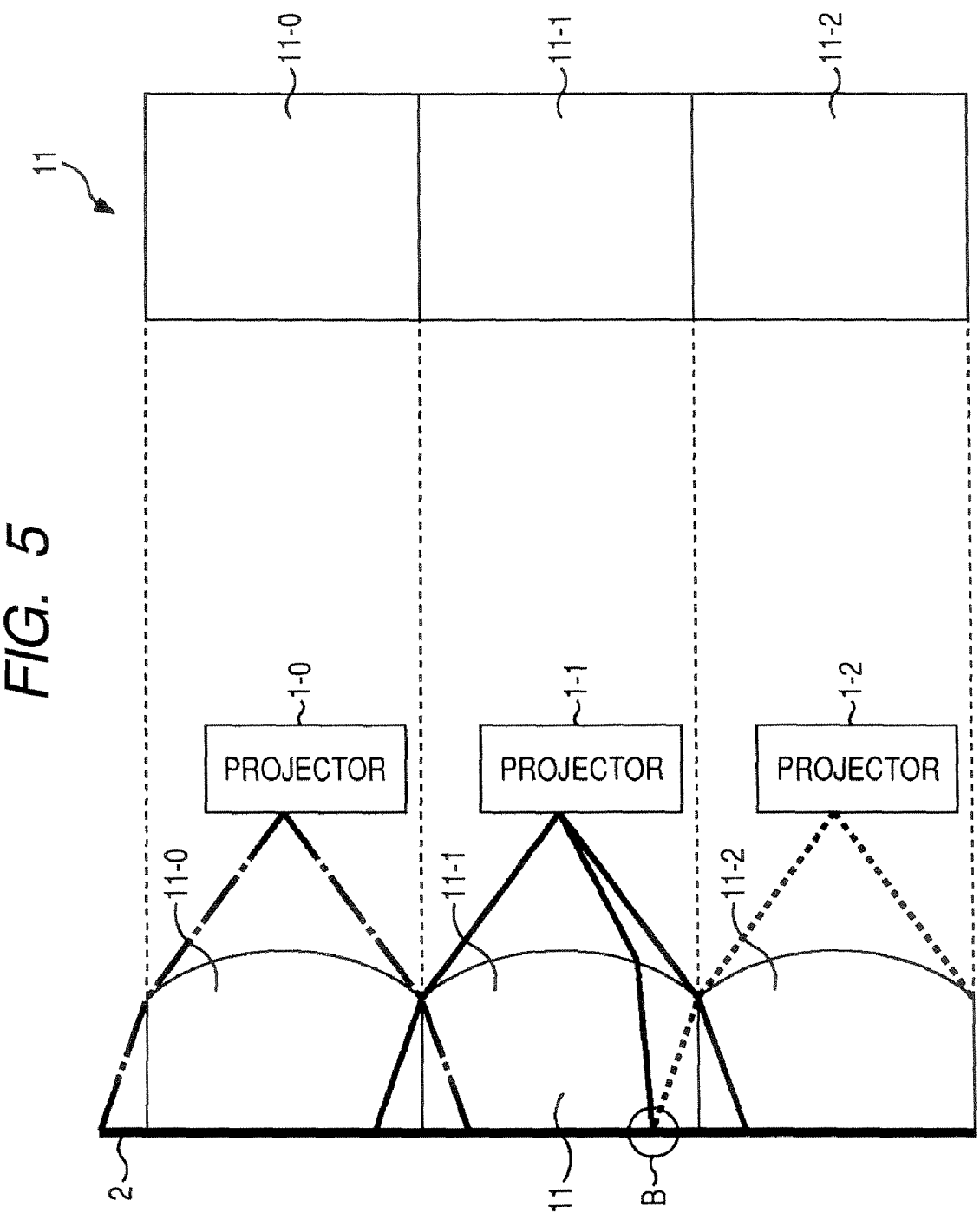
FIG. 5 is a diagram showing a configuration of a multi rear projector system as an image forming apparatus according to an embodiment of the present invention.
Figure 6:
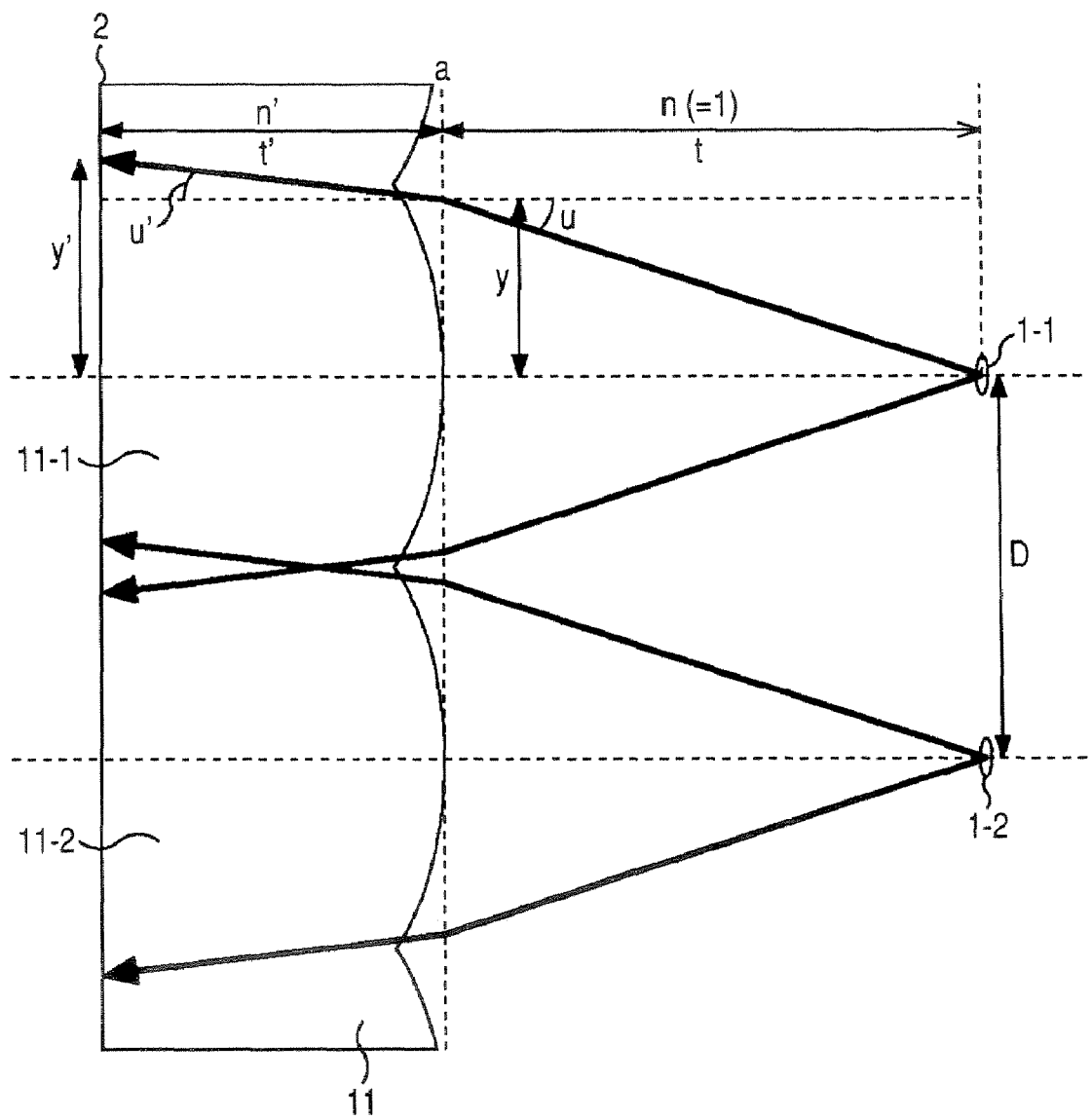
FIG. 6 is a diagram for describing values which may be required for design of the multi rear projector system shown in FIG. 5.

In an image forming apparatus according to an embodiment of the present invention (for example, multi rear projector system in FIG. 5) which forms a whole image including a first part image and a second part image on a front side of an image forming target unit formed by overlapping portions of the first and second part images, the image forming target unit (for example, screen 2 in FIG. 5), a first projector (for example, a predetermined one of projectors 1-0 to 1-2 in FIG. 5, here, represented as projector 1-1) for projecting light corresponding to the first part image onto a back side of the image forming target unit, a second projector (for example, a predetermined one of projectors 1-0 to 1-2 in FIG. 5, here, represented as projector 1-2) for projecting light corresponding to the second part image onto the back side of the image forming target unit, a first planoconvex lens (as an example, here denoted as planoconvex lens 11-1 in FIG. 5) corresponding to the first projector, and a second planoconvex lens (as an example, here denoted as planoconvex lens 11-2 in FIG. 5) corresponding to the second projector are included, the first and second planoconvex lenses are configured so that flat sides of the first and second planoconvex lenses face a back side of the image forming target unit, a convex side of the first planoconvex lens faces a projection side of the first projector, a convex side of the second planoconvex lens faces a projection side of the second projector, and a position at which light beams projected from the first and second projectors meet with each other is inside the first or second planoconvex lenses, and the image forming target unit, the first and second projectors, and the first and second planoconvex lenses are separately disposed, respectively (as an example, please refer to FIGS. 5 and 6).

The first planoconvex lens and the second planoconvex lens are formed into one structure (for example, structure 31 of FIG. 8).

An image forming method according to another embodiment of the present invention corresponds to an image forming apparatus according to an embodiment of the present invention.

Hereinafter, embodiments of the present invention will now be described with reference to the accompanying drawings.

FIG. 5 is a diagram showing a structure of a multi rear projector system in which a tiling technique is used as an image forming apparatus according to an embodiment of the present invention. A system according to an embodiment of the present invention represents a whole apparatus including a plurality of apparatuses or components.

In FIG. 5, a diagram on the left side represents a side view of the image forming apparatus, and a diagram on the right side represents a rear elevation of planoconvex lens array 11 of the image forming apparatus to be described later.

In the example shown in FIG. 5, the multi rear projector system (image forming apparatus) is configured to include three projectors 1-0 to 1-3, screen 2, and planoconvex lens array 11.

Hereinafter, when three projectors 1-0 to 1-3 are not required to be separately indicated, three projectors 1-0 to 1-3 will be collectively referred to as projector 1.

Projector 1 can display a color image on screen 2 by irradiating (projecting) three primary color light including light having components of wavelengths corresponding to three primary colors on screen 2.

In the example shown in FIG. 5, three part images are formed on screen 2 by three projectors 1-0, 1-1, and 1-2, and as a result, a whole image including the three part images is formed on screen 2. In the case, a blending area which is formed by two part images of projectors 1-0 and 1-1 and a blending area which is formed by two part images projectors 1-1 and 1-2 are formed on screen 2.

Figure 1:
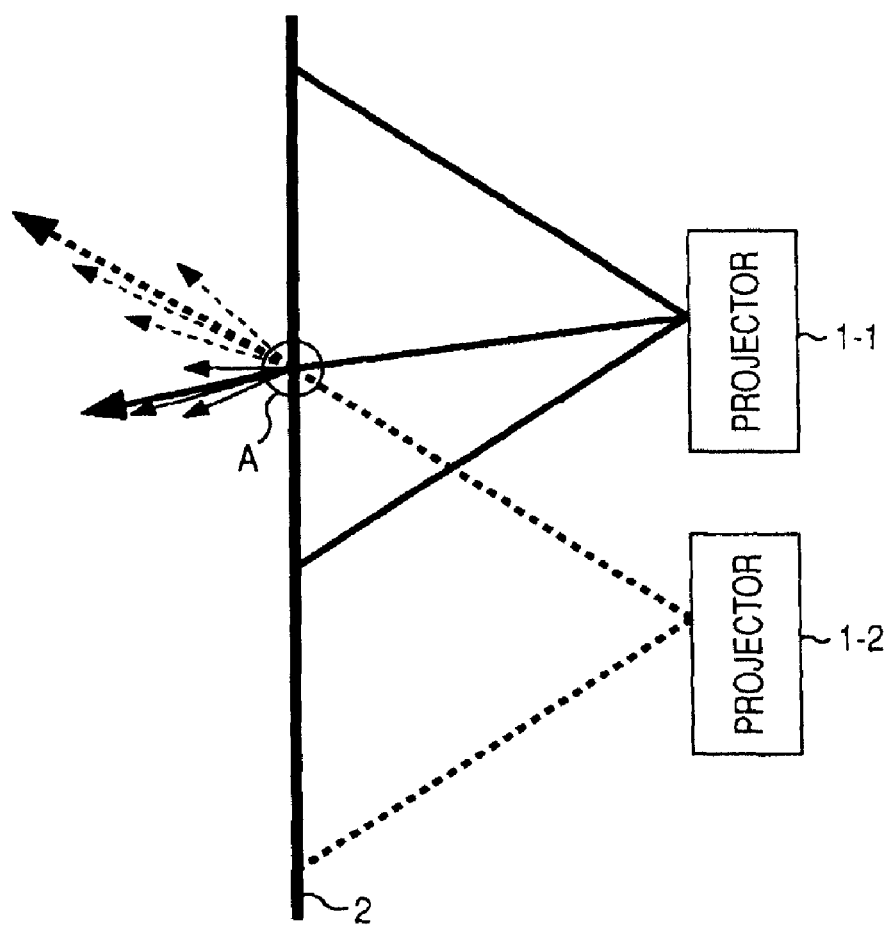
FIG. 1 is a diagram showing an example of configuration of a multi rear projector system of a related art.

As it can be known when reference numerals in FIGS. 1 and 5 are compared with each other, a projector and a screen which are used in related art can be used as projector 1 and screen 2. The number of projector 1 is not limited to three and may be an arbitrary number equal to or greater than two. The overlapping of part images is in the up/down direction with respect to screen 2 in the example shown in FIG. 5, but not limited thereto. As an example, the overlapping may be in the left-right direction with respect to screen 2, and alternatively, a combination of the up/down direction and the left-right direction with respect to screen 2 may be used for the overlapping.

In the example shown in FIG. 5, planoconvex lens array 11 is a combination of three planoconvex lenses 11-0 to 11-2, for example, made of plastic, glass, acryl, or the like, which are disposed in the direction (in the example shown in FIG. 5, the up/down direction of screen 2) projectors 1-0, 1-1, and 1-2 are disposed. In other words, planoconvex lenses 11-0 to 11-2 correspond to projectors 1-0 to 1-2, respectively.

In the case, each one of planoconvex lenses 11-0 to 11-2, as shown in a right diagram of FIG. 5, is cut to have a rectangular shape viewed from a back side so that planoconvex lens 11-0 to 11-2 can be joined together.

On a flat side of each one of planoconvex lenses 11-0 to 11-2, a back side of screen 2 is disposed. On convex sides of planoconvex lenses 11-0 to 11-2, corresponding projector 1-0 to 1-2 are disposed, respectively.

Planoconvex lens array 11 is configured or projector 1, screen 2, and planoconvex lens array 11 are disposed so that each one of convex sides of planoconvex lenses 11-0 to 11-2 is placed before a location at which each light beam of corresponding projectors 1-0 to 1-2 and a light beam from another projector 1 to form a blending area meet with each other.

Here, "another projector 1 to form a blending area" means projector 1-1 for projector 1-0 corresponding to planoconvex lens 11-0, projectors 1-0 and 1-2 for projector 11-1 corresponding to planoconvex lens 11-1, and projector 1-1 for projector 1-2 corresponding to planoconvex lens 11-2.

In addition, "before a place at which light beams of two projectors 1 meet" means a place which is spaced with a predetermined distance from a position light beams of two projectors 1 meet in the direction projector 1 is disposed when a user views an image of screen 2 (viewed from a left side to a right side in FIG. 5). In other words, light beams of two projectors 1 are crossed inside planoconvex lenses 11-0 and 11-2, respectively.

To be described in more details, as an example, values are denoted as in FIG. 6, respectively. A distance between projector 1-1 and planoconvex side a of planoconvex lens 11-1 having a curvature radius of r is denoted as t, and a thickness of planoconvex lens 11-1 is denoted as t', respectively. In addition, a reflective index of a space between projector 1-1 and planoconvex side a of planoconvex lens 11-1 is denoted as n(=1), and a reflective index of planoconvex lens 11-1 is denoted as n'. In addition, a radius (a distance between a center of projector 1-1 and an end portion of planoconvex lens 11-1) of planoconvex lens 11-1 is denoted as y, an angle of incidence of a light beam irradiated onto an end portion of planoconvex lens 11-1 among light beams from projector 1-1 is denoted as u, an angle of the light beam after reflection is denoted as u', and a distance between a incident location of the light beam after reflection with respect to a back surface of screen 2 and a center of projector 1-1 is denoted as y'. In addition, a distance between centers of projectors 1-1 and 1-2 is denoted as D.

By using a paraxial ray-tracing method for approximation, it can be configured that sin u=u and cos u=1. As necessary conditions, y<D/2 may be required since light beams of two projectors 1 need to be met with each other inside planoconvex lens array 11, and y'>y may be required since a blending area needs to be exist.

In the case, Equation (1) based on an equation of propagation, Equation (2) based on an equation of reflection, and Equation (3) based on the equation of propagation are satisfied, respectively.

$$y=u*t \qquad (1)$$

$$n'*u'=n*u-y*(n'-n)/r \qquad (2)$$

$$y'=y+u'*t' \qquad (3)$$

Here, when Equations (1) and (3) are substituted in Equation (2) and u and u' are removed, the following Equation (4) is obtained.

$$r=t*t'*(n'-1)/\{t'-n'*t*(y'/y-1)\} \qquad (4)$$

Figure 4:
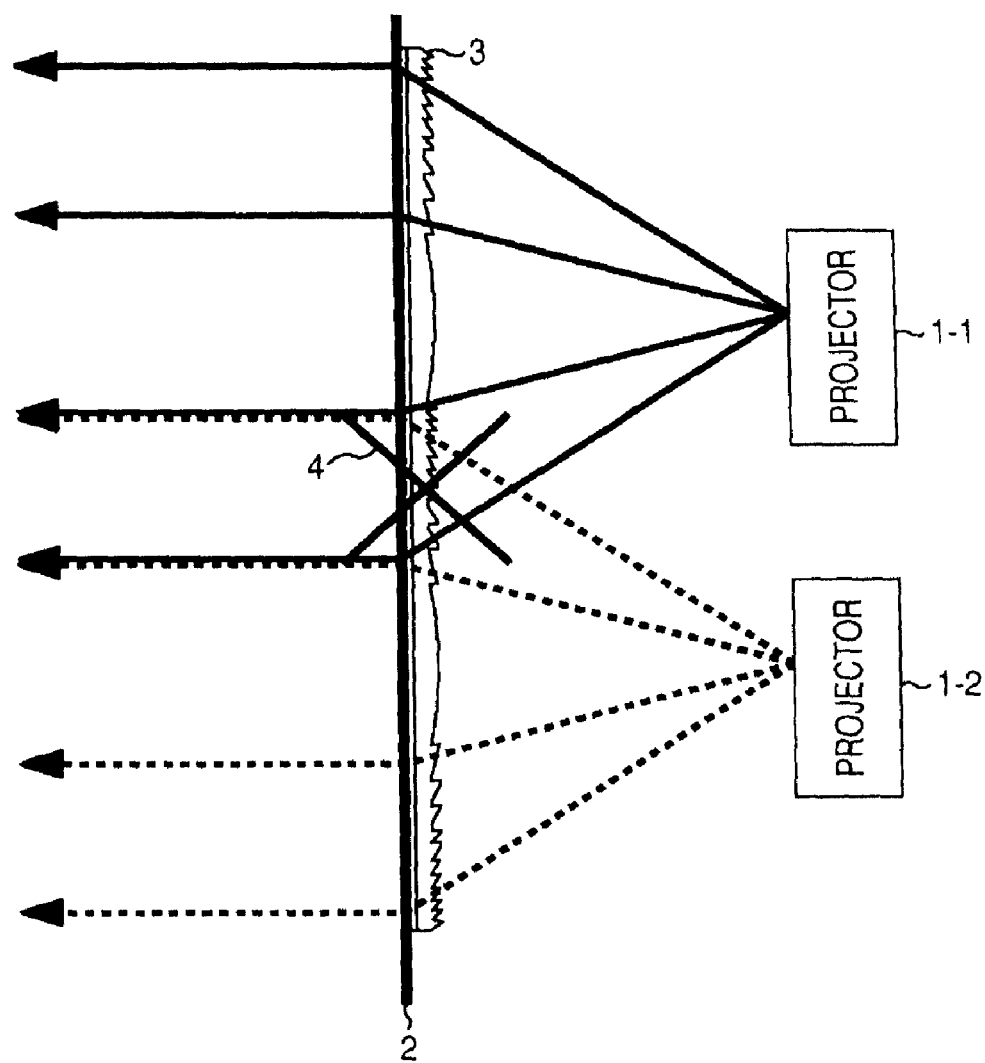
FIG. 4 is a diagram for describing an interference between fresnel lenses which occurs when a fresnel lens is used in the multi rear projector system in FIG. 1 in the related art.

Accordingly, values of r, t, t', y, y' and n' are determined (designed) so as to satisfy Equation (4), and based on the determined values (set values), planoconvex lens array 11 is configured (manufactured) or each projector 1, screen 2, and planoconvex lens array 11 are arranged. As a result, interference described with reference to FIG. 4, that is, an interference cause by fresnel lens 3 which occurs in blending area 4 can be prevented.

In addition, by using planoconvex lens array 11, it becomes possible to collect the light beam from each projector in the blending area so as to make the angle of the projected light beam in the blending area even more close to zero degree (the normal direction of an image forming side of screen 2 and the horizontal direction in FIG. 5). As a result, it becomes possible to solve the viewing position deterioration problem described above as possibly as can.

Figure 7:
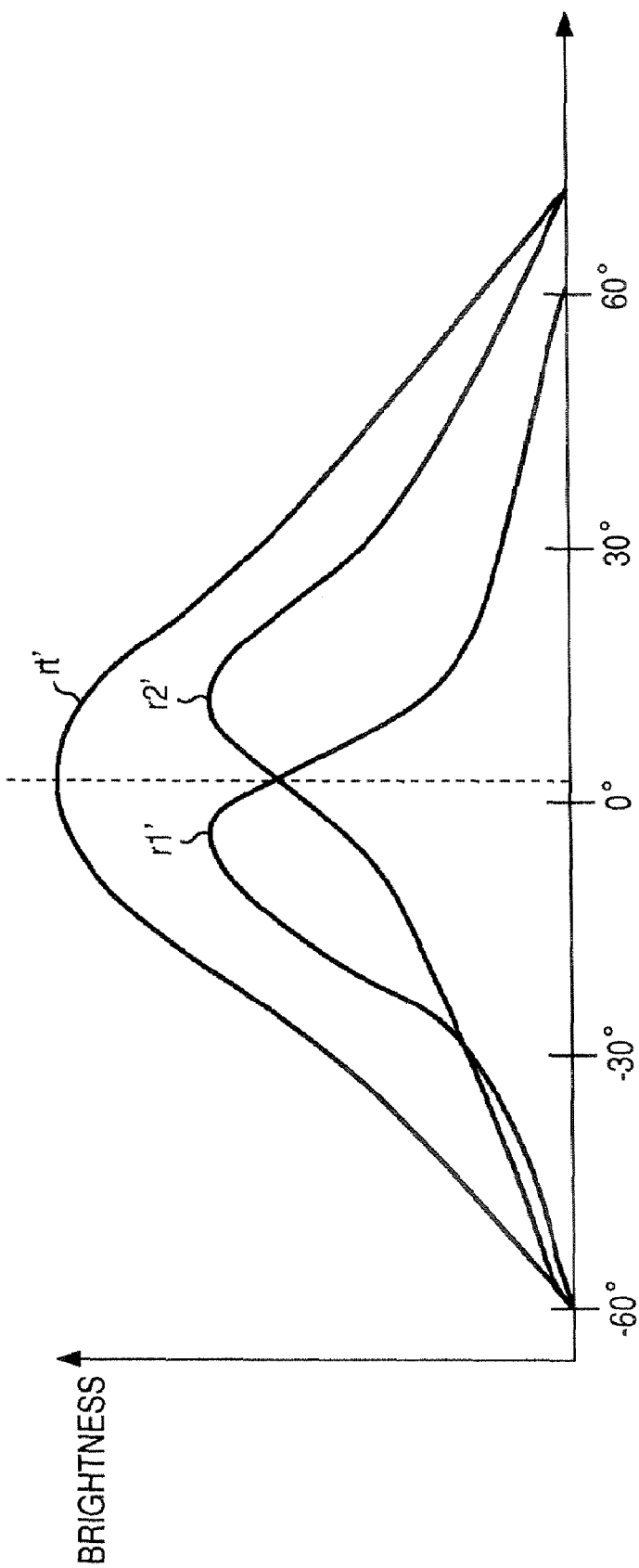
FIG. 7 is a graph showing an example of brightness distribution of projected light beam in a blending area which is formed on a screen by the multi rear projector system shown in FIG. 5 according to an embodiment of the present invention.

To be described in more details, in the example shown in FIG. 5, a spot of point B on screen 2 becomes a joint spot, but the brightness distribution of a projected light beam at point B is as shown in FIG. 7.

In FIG. 7, curve r1' represents brightness distribution of a light beam projected from projector 1-1. Curve r2' represents brightness distribution of a light beam projected from projector 1-2. As a result, right distribution of total light beams projected from projectors 1-1 and 1-2 is represented as curve rt'.

Figure 2:
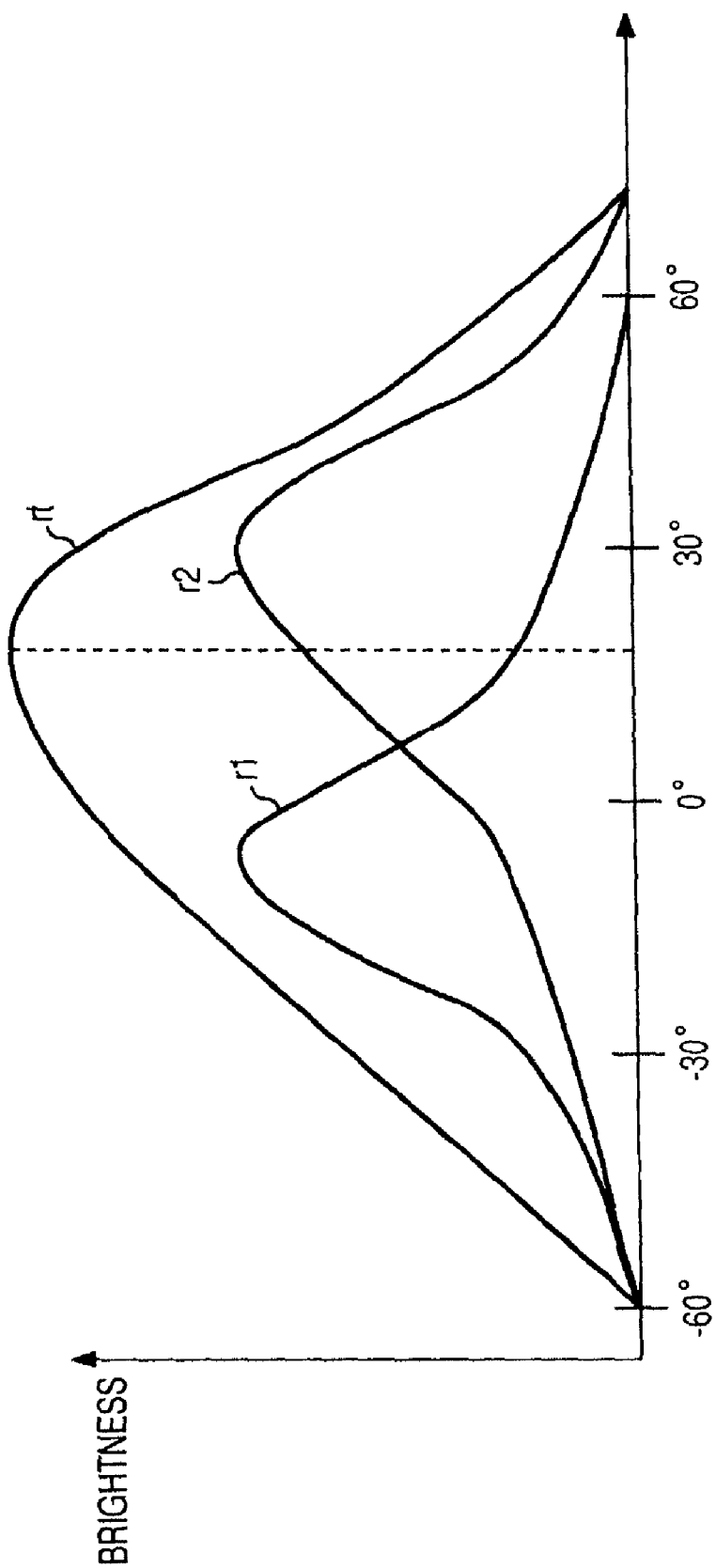
FIG. 2 is an example of brightness distribution of an irradiated light beam in a blending area which is formed on a screen by the multi rear projector system in FIG. 1.
Figure 3:
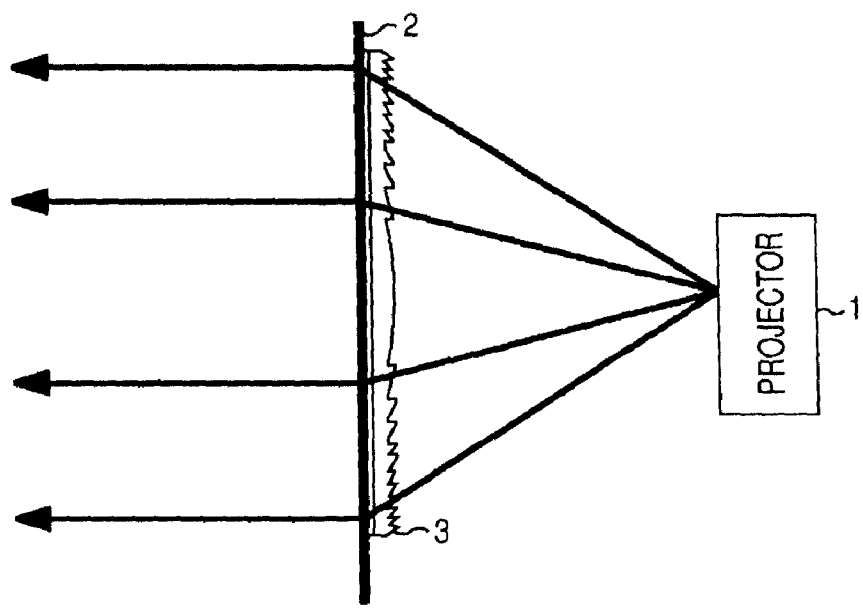
FIG. 3 is a diagram showing a configuration of a rear projector using a fresnel lens in the related art.

As is clear when curve rt in FIG. 2 and curve rt' in FIG. 7 are compared, by using planoconvex lens array 11, brightness distribution of total light beams projected from projectors 1-1 and 1-2 becomes even more closer to ideal brightness distribution.

In the case, an image corresponding to light having the brightness distribution represented by curve rt' shown in FIG. 7, that is, an image corresponding to total light beams projected from projectors 1-1 and 1-2 is viewed as an image of a spot of point B, that is, an image of a joint spot of the blending area to the user. Accordingly, in viewing the spot image at point B, the spot image at point B seems almost the same to the user when a viewing position changes. In other words, the viewing position deterioration problem described above rarely occurs.

In a case where a multi rear projector system in FIG. 5 is configured, as an example, as shown in a right diagram in FIG. 8, it is possible to attach planoconvex lens array 11, by fixing each one of planoconvex lens 11-0 to 11-2 constructing planoconvex lens array 11 to a notched member 21 (hereinafter referred to as frame 21), to frame 21. In the case, the material of frame 21 is not limited, but a material having a high strength such as steel may be appropriate.

In the case, since planoconvex lens array 11 is attached to frame 21, a structure 31 as shown in the left diagram of FIG. 8 can be acquired. In other words, the left diagram of FIG. 8 is a diagram of structure 31 when viewed from a back side, that is, from a projector 1-1 side.

In other words, by preparing frame 21, it becomes needless to configure planoconvex lens array 11 in advance, and by manufacturing as a module such as each one of planoconvex lens 11-0 to 11-2 and fixing each module (each one of planoconvex lens 11-0 to 11-2) to frame 21, it becomes possible to configure each planoconvex lens array 11 easily as structure 31.

In the case, by setting screen 2 as a soft screen (hereinafter, referred to as soft screen 2) like a wall paper in a front side (opposite side to a back side shown in a left diagram of FIG. 8) of structure 31, that is, flat sides of planoconvex lens 11-0 to 11-2, one hard screen can be easily implemented.

A rear projector system in related art is frequently used as a large scale, and accordingly, a large screen of the rear projector system is frequently used. For a small screen, it was possible to use a hard screen in the related art, but it was difficult to use a large hard screen since there is a problem including a size of a gateway through which the hard screen is to be passed. For example, it was almost impossible in the related art to implement display of a whole surface covering from the ceiling to the floor as one hard screen. In addition, although it was possible to join a plurality of hard screens in the related art, and, however, in that case, a joint portion was always to be seen to generate visual deterioration.

To the contrary, by assembling a frame (frame 21 in the example of FIG. 8) having a floor-to-ceiling size indoors in advance, delivering modules to be inserted into frame 21 (three planoconvex lens 11-0 to 11-2 in the example shown in FIG. 8) indoors, and inserting the modules into frame 21, structure 31 is assembled. In addition, by attaching soft screen 2 having a floor-to-ceiling size to a front side of structure 31, it becomes possible to implement one hard screen having a floor-to-ceiling size easily. In addition, in the case, it becomes possible for the screen to be a diffuser and to hide joint portions between the modules.

As described above, by using an image forming apparatus (multi rear projector system in which a tiling technique is used) including the configuration of FIG. 5 described above according to an embodiment of the present invention, it becomes possible to reduce a visual deterioration of a blending area caused by differences of projected light beams, that is to solve a viewing position deterioration problem described above as possible as can. In addition, it becomes possible to easily build a hard screen of a large scale rear projector system. In addition, as can be easily known from comparing FIGS. 1 and 5, since the blending area becomes smaller compared with that of a related art, an image having an excellent quality can be acquired, and accordingly a pixel can be used effectively.

The present invention is not limited to the embodiments described above. As an example, an image forming apparatus according to an embodiment of the present invention includes a projector in the embodiments described above, but not limited thereto, and when the image forming apparatus includes a component having a function of projecting light corresponding to a predetermined part image on a back side of an image forming target unit such as a screen, the image forming apparatus is included in the scope of the present invention, and the configuration according to an embodiment of the present invention is not limited.

In addition, an image forming target unit is described as a screen in the described examples, but not limited thereto, and various objects such as a white wall can be employed.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus which forms a whole image including a first part image and a second part image on a front side of an image forming target unit formed by overlapping portions of the first and second part images, the image forming apparatus comprising:

the image forming target unit;

a first projector projecting light corresponding to the first part image onto a back side of the image forming target unit;

a second projector projecting light corresponding to the second part image onto the back side of the image forming target unit;

a first planoconvex lens corresponding to the first projector; and a second planoconvex lens corresponding to the second projector;

wherein the first and second planoconvex lenses are configured so that flat sides of the first and second planoconvex lenses face a back side of the image forming target unit, a convex side of the first planoconvex lens faces a projection side of the first projector, a convex side of the second planoconvex lens faces a projection side of the second projector, and a position at which light beams projected from the first and second projectors meet with each other is inside the first or second planoconvex lenses, and wherein the image forming target unit, the first and second projectors, and the first and second planoconvex lenses are separately disposed, respectively.

2. The image forming apparatus of claim 1, wherein the first and second planoconvex lenses are formed into one structure.

3. The image forming apparatus of claim 2, wherein the image forming target unit is a soft screen, and wherein a back side of the soft screen is attached on flat sides of the first and second planoconvex lenses of the structure.

4. An image forming method using an image forming apparatus which includes an image forming target unit on which the image is formed in a front side by projecting light corresponding to an image on a back side of the image forming target unit, a first projector projecting light corresponding to a first image onto a back side of the image forming target unit, a second projector projecting light corresponding to a second image onto the back side of the image forming target unit, a first planoconvex lens corresponding to the first projector, and a second planoconvex lens corresponding to the second projector, wherein the first and second planoconvex lenses are configured so that flat sides of the first and second planoconvex lenses face a back side of the image forming target unit, a convex side of the first planoconvex lens faces a projection side of the first projector, a convex side of the second planoconvex lens faces a projection side of the second projector, and a position at which light beams projected from the first and second projectors meet with each other is inside the first or second planoconvex lenses, and wherein the image forming target unit, the first and second projectors, and the first and second planoconvex lenses are separately disposed, respectively, the image forming method comprising the steps of:

forming the first image on a front side of the image forming target unit by projecting light corresponding to the first image which is irradiated from the first projector onto a back side of the image forming target unit through the first planoconvex lens;

forming the second image on the front side of the image forming target unit by projecting light corresponding to the second image which is irradiated from the second projector onto the back side of the image forming target unit through the second planoconvex lens; and forming an image including the first and second images and having an overlapped area between a part of the first image and a part of the second image on the front side of the image forming target unit.

\* \* \* \* \*